United States Patent [19]

Eckmayer et al.

[11] 4,220,723
[45] Sep. 2, 1980

[54] ENZYMATIC TREATMENT OF PROTEINACEOUS ANIMAL WASTE PRODUCTS

[75] Inventors: Zdenek Eckmayer, Weinheim; Alexander Berg, Hirschberg; Rolf Monsheimer, Darmstadt-Eberstadt; Ernst Pfleiderer, Darmstadt-Arheilgen, all of Fed. Rep. of Germany

[73] Assignee: Röhm GmbH, Darmstadt, Fed. Rep. of Germany

[21] Appl. No.: 971,115

[22] Filed: Dec. 19, 1978

[30] Foreign Application Priority Data

Dec. 20, 1977 [DE] Fed. Rep. of Germany ....... 2756739
Oct. 2, 1978 [DE] Fed. Rep. of Germany ....... 2842918

[51] Int. Cl.$^2$ ............................ C14C 1/00; A23J 1/06
[52] U.S. Cl. ...................................... 435/265; 426/56
[58] Field of Search ........................................ 195/4-6, 195/29; 426/32, 55, 56, 57; 435/265, 273

[56] References Cited

U.S. PATENT DOCUMENTS 4,019,956   4/1977   Saby .......................................... 195/6

FOREIGN PATENT DOCUMENTS 2709035   9/1978   Fed. Rep. of Germany ............. 195/29

OTHER PUBLICATIONS

Doty, in Alternative Source Protein Animal Prod. Symp. 61-72 (1973).
Connelly, in Food Technology, pp. 125-130 (1966).

Primary Examiner—Lionel M. Shapiro
Attorney, Agent, or Firm—Curtis, Morris & Safford

[57] ABSTRACT

A method for converting blood, animal parts, bone waste, or meat scraps into useful products, which method comprises hydrolyzing such a substrate with a proteinase, preferably in the presence of urea, in an aqueous hydrolysis medium at a pH in a region in which the proteinase displays sufficient activity, subsequently inactivating the enzyme, and working up the hydrolyzate.

10 Claims, No Drawings

ENZYMATIC TREATMENT OF PROTEINACEOUS ANIMAL WASTE PRODUCTS

The present invention relates to a method of treating proteinaceous animal waste products such as blood, animal parts, bones, and meat scraps to produce valuable protein products.

Blood, animal parts, bones, and meat scraps are waste products which have heretofore been only partly or even incompletely utilized. Bone wastes can be converted into glue in conventional fashion. The present invention has as its object the conversion of waste products of the aforementioned kind into directly utilizable products.

This object has been attained by means of a method wherein suitably prepared material, optionally after an acid or alkaline protein denaturization at about 100° C. and cooling to about 20° C.–70° C., is enzymatically treated. The hydrolysis is carried out in a pH region in which the enzymes develop sufficient activity, preferably in the presence of urea. The products are subsequently worked up in a manner most suitable for the end product which is desired.

The method according to the present invention will first be illustrated by way of specific reference to blood, which, for example, is obtained from animal slaughter.

Blood comprises protein-rich plasma in which the red and white blood corpuscles are suspended as cellular elements, together with blood platelets. The red blood corpuscles are well known to contain the material which imparts blood its color, namely hemoglobin.

In plasma, a number of proteins, namely albumin, various globulins, and fibrinogen are present in addition to inorganic salts.

During the course of blood coagulation, insoluble fibrin is formed—within the fine network of which all of the formed elements of blood, for example, the hemoglobin, are included—from soluble fibrinogen, catalyzed by the enzyme, thrombin. In practical methods for working up blood, coagulation is hindered mainly by the addition of salts which inhibit clotting. From stabilized blood of this sort, one can obtain by centrifugation about 70% of blood plasma containing 7–8% by weight of protein, which is then converted to dry plasma.

The residue remaining from plasma recovery (blood cake) is the source of thick blood ("heavy blood").

There has been no lack of attempts to use blood obtained from slaughtering processes, as well as blood wastes, which are to be considered to a certain extent as an ecological burden, for nutritional purposes because of their potential nutritional value, or for some alternative purpose. [Cf. D. M. Doty in "Alternative Source Protein Anim. Prod. Proc. Symp.," pp. 62–72 (1973)]. A meaningful utilization of thick blood, for example in nutrition, has proved to be particularly problematic.

According to the present invention, the proteins which are found in blood after slaughter or which can be recovered from blood, particularly the proteins which can be found in thick blood, can be worked up into utilizable hydrolyzates if the aforementioned protein substrate is hydrolyzed by one or more proteinases in a pH region in which the enzyme develops sufficient activity, preferably in the presence of urea.

In this process, the protein substrate can, for example, be in the form of the usual heavy blood, without any additional pre-treatment, or, optionally, can be used after a pre-treatment.

The method of the present invention generally calls for the heating of raw blood to a temperature in the region from 90° C. to 100° C., in general to a temperature of about 95° C. Even in the case of non-denatured raw material, a decomposition in the sense of the process of the present invention can be detected.

As enzymes for the process of the invention, neutral and acid proteinases, particularly however, alkaline proteinases, are to be used.

The decomposition is suitably carried out in a pH region in which the enzyme or enzymes develop sufficient activity, thus, as a rule, in the pH region optimum for the enzyme in question. The optimum pH regions for the individual enzymes are known.

Suitable pretreatment of animal parts, bone wastes, and meat scraps as a rule includes comminution of the starting material. This comminution occurs in conventional fashion, for example, by grinding of meat scraps and/or chopping up bones.

It has proved useful to carry out a denaturization of the protein prior to enzymatic treatment by cooking the comminuted materials in an aqueous medium with the addition of strongly acid or strongly alkaline substances such as, for example, caustic soda or concentrated sulfuric acid. Subsequently the mixture is cooled and the enzymatic decomposition is carried out at about 20° C. to 70° C. Decomposition takes place in that pH region in which a sufficient activity is developed by the chosen enzyme, i.e. in general in the optimum pH region. Alkaline proteinases, for example, have an activity optimum between pH 8 and pH 13. They are particularly advantageously used in the presence of urea. Neutral proteinases have an activity optimum between pH 6 and pH 8.5, while acid proteinases have an activity optimum between pH 2 and pH 7.

Also, the remaining parameters in the method according to the present invention are adapted to the conditions conventional for the particular enzyme system employed.

Thus, the temperature of enzymatic treatment is as a rule between room temperature and 70° C., preferably between 25° C. and 50° C. In general, it is emphasized that the method of the present invention proceed under mild conditions.

As proteinases, those of microbiological origin are principally used, particularly those which are obtained from bacteria or fungi.

Among those which should be mentioned are alkaline proteinases obtained from bacillus types such as *Bacillus subtilis*, *Bacillus alcalophilus*, *Bacillus licheniformis*, *Bacillus cereus*, and *Bacillus mycoides*, particularly the so-called subtilisins [cf. P. D. Boyer et al. in "The Enzymes," 3rd Ed. Vol. III, pp. 566 et seq., Academic Press (1973)].

Further, enzymes from Aspergillus-types and Streptomyces-types can be used according to the present invention. Among these, *Aspergillis oryzae*, *Aspergillis flavus*, *Aspergillis saitoi*, *Aspergillis parasiticus*, and, further, *Streptomyces griseus* should be mentioned.

The use of several enzymes in combination can be advantageous, for example, the complexes of neutral and alkaline proteinases and accompanying enzymes which are obtained from micro-organisms. Further, the use of animal and plant proteinases, for example the use of pepsin as an acid proteinase and/or of papain and of bromelain is also contemplated. Amylases having attendant proteolytic activity can be used instead of proteinases or in combination with proteinases, particularly in an acid reaction medium. The attendant proteolytic activities of amylases found in commercial amylase preparations are known as a rule. Such enzymes can be treated, with respect to the amount thereof and the remaining technology of their use, using the data given for acid proteinases. The pancreatic amylases, fungus amylases and bacterial amylases which can be used in the acid region should be particularly mentioned. The amounts of the aforementioned enzymes which are used are correlated with their activity. In general, the amount of the commercially-available enzyme preparations used in an enzymatic batch is from 0.1 to about 5% by weight of the substrate, i.e. of the meat scraps, thick blood, etc., being treated. A relatively short duration of the enzymatic decomposition step according to the present invention is particularly advantageous. In general, a period from one to five hours, as a rule from two to three hours, is sufficient for carrying out the enzymatic decomposition.

According to a particularly advantageous embodiment, urea is added in a concentration between 0.01 mol/liter and 1 mol/liter to the enzymatic batch, preferably in an amount between 0.02 mol/liter and 0.2 mol/liter. In addition, the enzymatic batch can contain further additives which are advantageous for the specific enzyme or enzymes employed, for example salts such as ammonium salts, for example ammonium sulfate or ammonium chloride. A subsequent removal or decomposition of the urea, for example by enzymes, is also possible.

As to other respects, the enzymatic method can be carried out in agreement with the usual process conditions. Working up proceeds in the usual fashion, for example by inactivation of the enzyme employed, preferably by (short-time) heating at 90° C. Advantageously, the hydrolyzate is freed of any solid components which may be present by sieving and is subsequently freed of water, for example by means of spray drying. As a rule, an almost colorless powder is obtained, which particularly has the characteristic that it shows only little hygroscopicity, or none at all.

The protein hydrolyzates are the most valuable portion of the product obtained according to the method of the invention. By the use of suitable enzyme mixtures, different protein hydrolyzates can be prepared which differ from each other in their degree of decomposition, i.e. their molecular size. In this way, depending on the end use, the starting material can be worked up into very homogeneous products. The hydrolyzates obtained are also distinguished by reproducible uniformity and high quality in comparison with conventional protein hydrolyzates. By a combination of the kind of enzyme, enzyme concentration, and decomposition time, protein hydrolyzates having long chains, average chains, or short chains can be obtained.

When working up animal parts, bone wastes, and meat scraps according to the enzymatic treatment, one may proceed as follows:

After decomposition is complete, the water-soluble protein hydrolyzate is separated by removal of fat and possible insoluble residues. The fat and hydrolyzate can be readily separated, for example by centrifugation. The insoluble residue is filtered off.

The fat present as a waste product is suitably separated by centrifugation into a solid and a liquid phase. Both fractions are purified by washing. The liquid phase has a composition very similar to neat's foot oil. The fat products can be still further purified by chemical reaction. Particularly when working up bones, as a rule there is a very difficultly soluble residue which, in addition to mineral materials, also contains protein and which can be used either for the preparation of fertilizers or as an additive for animal nutrition.

The technical investment required by the present invention is, in every case, small. When working up animal parts, bone wastes, and meat scraps, the material is for example, enzymatically hydrolyzed in a mixer or cooking vessel provided with a stirrer, and, after addition of the enzymes, need only be subjected to enzymatic action for a brief period—as a rule about three hours are sufficient. The separation of fat components and protein components follows quickly, usually after about an hour. The phases separated from one another by demixing are then further worked up separately in the manner described.

The cloudy hydrolyzate solution essentially contains protein together with considerable amounts of mineral materials which, optionally, must be separated again by precipitation. The clear filtrate is then concentrated to the desired concentration. The filtrate can be preserved and can be directly used as such.

The proteolytic activity of the enzymes is suitably determined according to the Loehlein-Volhard-Method [cf. "The Loehlein-Volhard-Method for Determination of Proteolytic Activity," Gerbereitechnisches Taschenbuch, Dresden-Leipzig (1955)]and is reported in "LVU" (Loehlein-Volhard Units). One LVU is that amount of enzyme which digests 1.725 mg of casein under the specific conditions of the method. For determining the activity of enzymes effective in the acid region, the Anson method is pertinent [M. L. Anson, J. Gen. Physiol. 22, 79 (1939)]. The units are designated as "proteinase units (hemoglobin)"=$U_{Hb}$. One $U_{Hb}$ corresponds to that amount of enzyme which catalyzes the release of hemoglobin fragments, soluble in trichloroacetic acid, in an amount equivalent to one micromol of tyrosine per minute at 37° C. (measured at 280 nm). 1 $mU_{Hb} = 10^{-3} U_{Hb}$.

The method requires only a short treatment time of waste products and protects the environment since there is no odor pollution. The raw materials are optimally utilized and water-soluble neutral-tasting protein hydrolyzates are obtained in high yield. A better understanding of the present invention and of its many advantages will be had by referring to the following specific examples given by way of illustration.

EXAMPLE 1

500 g of meat scraps are comminuted in a mincing machine. Subsequently, they are combined with 1000 ml of water and 20 g of caustic soda and heated at 100° C. with stirring for 60 minutes. The mixture is then cooled to 50° C. and 2 g of alkaline bacterial proteinase from Bacillus subtilis (LVU=9000), 8 g of urea, and 10 g of ammonium sulfate are added. Hydrolysis follows with stirring at 50° C. over a period of two hours. After this time, more than 90 percent of the material weighed in has been converted. The pH value of the hydrolyzate is 11.0.

The fatty layer is separated from the hydrolyzate by centrifugation. It comprises a brownish oil layer and solid fat or tallow.

The hydrolyzate is utilizable without further purification.

EXAMPLE 2

500 g of pork meat scraps are comminuted in a mincing machine and combined with 1000 ml of water, 15 g of caustic soda, 2 g of alkaline bacterial proteinase from *Bacillus subtilis* (LVU=9000), 8 g of urea, and 10 g of ammonium sulfate. Enzymatic decomposition follows with stirring at 50° C. and the material is hydrolyzed for a further two hours. Now, 95 percent of the original material has been converted. After decanting of the fat portion, the hydrolyzate is heated with activated charcoal for 10 minutes at 100° C. to inhibit the enzyme and for purification.

After cooling, the hydrolyzate is centrifuged and filtered to clarify it. The pH value of the hydrolyzate is 8.9. The hydrolyzate can be used directly in this form.

EXAMPLE 3

450 g of poultry meat scraps are comminuted in a mincing machine and combined with 1000 ml of water, 10 g of caustic soda, 2 g of alkaline bacterial proteinase from *Bacillus subtilis* (LVU=9000), 8 g of urea, and 10 g of ammonium sulfate. Enzymatic decomposition follows with stirring at 50° C. The hydrolysis is carried out for a further two hours. After this time, 85 percent of the original poultry meat scraps are converted. The purification of the hydrolyzate follows as in Example 2. The pH value is 12.0.

EXAMPLE 4

450 g of chicken meat scraps were ground in a mincing machine and combined with 1000 ml of water and 10 g of 98 percent sulfuric acid. The mixture was then warmed with stirring to 50° C. and combined for hydrolysis with 0.4 g of fungus proteinase from *Aspergillis oryzae* (LVU=3000), 1 g of papain (1.60 $mU_{Hb}$/mg at pH 7.5), 6 g of urea, and 3 g of ammonium sulfate. The treatment time amounted to five hours. At this point, more than 80 percent of the starting material is converted. Purification of the hydrolyzate follows as in Example 2. The pH value is 4.1.

EXAMPLE 5

One liter of fresh ox blood (with clotting protection) is centrifuged and the blood plasma is separated. The remaining heavy blood (about 450 g) is again diluted with water in a ratio of 1:3. The resulting suspension is heated with agitation (stirring) at about 95° C. for 15–20 minutes.

After cooling to 60° C. the material is adjusted to a pH of 10.5–11.5 with about 3 percent caustic soda or some other alkali. To the batch, maintained at 60° C., portions, each amounting to about 4 percent of the original weight of heavy blood, are added of a mixture of 2 g of alkaline bacterial proteinase derived from *Bacillus licheniformis* (9000 LVU), 8 g of urea, and 10 g of ammonium sulfate. The enzyme batch is agitated for about 60–180 minutes at 60° C. Subsequently, the enzyme is inactivated by heating to 90° C. Then the material is passed through a sieve and the remaining solution is adjusted to a pH of about 6 with acetic acid. Subsequently, the material is filtered, centrifuged, and spray-dried. A lightly-colored, loose, not particularly hygroscopic product is obtained (about 11% yield, calculated on the fresh blood).

Instead of an enzyme from *Bacillus licheniformis*, an enzyme obtained from *Bacillus subtilis, Bacillus alcalophilus*, or *Bacillus mycoides* can be used with equally good success, for example.

EXAMPLE 6

5 liters of fresh blood are prepared as in previous Example 5 to obtain heavy blood. One part of this thick blood is heated with 3 parts of water for 15–20 minutes with agitation at 95° C. After cooling to about 60° C., the pH is adjusted to 5 with 80 percent acetic acid and then about 2 percent, by weight of the heavy blood, of the following mixture is added: 0.8 g of acid fungus proteinase from *Aspergillis oryzae* (3000 LVU), 2.0 g of papain (160 $mU_{Hb}$/mg at pH 7.5), 12.0 g of urea and 6.0 g of ammonium sulfate. The enzyme batch is agitated for 3–4 hours at 60° C. It is then inactivated by heating to about 90° C. After cooling, the material is filtered and subsequently spray-dried. A very light, loose product which is only slightly hygroscopic is obtained.

Instead of the acid enzyme from *Aspergillis oryzae*, equally good results can be obtained using enzymes obtained from *Aspergillis saitoi*, or *Aspergillis paraciticus*, among others.

EXAMPLE 7

1000 g of thick blood, which has been obtained from fresh cattle blood according to Example 5, is first diluted in a ratio of 1:3 and then thoroughly stirred at 20° C. Now it is heated to 60° C. in a water bath and adjusted to pH 6 with stirring, using 80 percent acetic acid. For enzymatic hydrolysis, the following are added: 0.8 g of bacterial amylase from *Bacillus subtilis* (80 $mU_{Hb}$/mg at pH 7.5), 0.5 g of acid fungus proteinase from *Aspergillis paraciticus* (80 $mU_{Hb}$/mg at pH 7.5), 8.0 g of urea, and 11.0 g of ammonium sulfate.

The hydrolysis takes 5–6 hours. The material is heated to 90° C. for inactivation. For stabilization, a preservative must be added to the solution or it must be spray-dried.

EXAMPLE 8

500 g of chicken meat scraps are milled in a mincing machine and combined with 1000 ml of water. The mixture is then heated with stirring on a water bath to 50° C. and adjusted to a pH of 6.0 with diluted sulfuric acid. 0.8 g of pancreatic amylase (160 $mU_{Hb}$/mg at pH 7.5), 4.0 g of urea, and 5.0 g of swollen corn starch are added for hydrolysis.

Hydrolysis requires 6 hours. More than 80 percent of the starting material is converted. The pH value of the hydrolyzate is 6.0. The hydrolyzate is purified as in Example 2.

What is claimed is:

1. A method for converting a substrate selected from the group consisting of blood, bone waste, and meat scraps into useful water-soluble hydrolysis products dissolved in water, which method consists essentially of treating such a substrate with an hydrolysis medium consisting essentially of water, a proteinase, and urea, said medium having a pH in a region in which the proteinase displays sufficient activity.

2. A method as in claim 1 wherein urea is present in the hydrolysis medium at a concentration from 0.01 mole/liter to 1 mole/liter.

3. A method as in claim 1 wherein said proteinase is a pure proteinase, a proteinase-amylase mixture having sufficient amylase activity in the pH activity-range of the proteinase, or a mixture thereof.

4. A method as in claim 1 wherein said proteinase is an acid proteinase, an amylase preparation having proteolytic activity, or a mixture thereof, and said aqueous hydrolysis medium has a pH between 2 and 7.

5. A method as in claim 4 wherein said proteinase is an acid proteinase.

6. A method as in claim 1 wherein said proteinase is an alkaline proteinase and said aqueous hydrolysis medium has a pH between 8 and 13.

7. A method as in claim 1 wherein said proteinase is a subtilisin.

8. A method as in claim 1 wherein said enzyme is present in an amount between 0.1 and 5 percent by weight of the substrate.

9. A method as in claim 1 wherein said substrate is, prior to enzymatic hydrolysis, subjected to an acid or alkaline protein denaturization at a temperature of about 100° C. and is then cooled to a temperature suitable for said enzymatic hydrolysis.

10. A method as in claim 1 wherein said substrate is heavy blood.

* * * * *